Patented Apr. 16, 1940

2,197,630

UNITED STATES PATENT OFFICE 2,197,630

FINGERNAIL CLEANING COMPOSITION

Horace M. Carter, New York, N. Y.

No Drawing. Application December 23, 1935,
Serial No. 55,836

3 Claims. (Cl. 87—5)

This invention relates to improvements in fingernail cleaner and method of making the same. It relates especially to a fingernail cleaner adapted to remove so-called "liquid polish", which is a lacquer having a cellulose ester base, usually cellulose nitrate.

Heretofore there have been made and sold liquid fingernail cleaners consisting essentially of lacquer solvents. Such cleaners have been objectionable due to their harshness, and when colored polishes are being removed, such cleaners cause the color to "run" underneath the nail and into the cuticle where it is very hard to remove. It is one purpose of this invention to afford a fingernail polish remover which is substantially free of such difficulties. Other purposes of this invention relate to affording a nail cleaner which is likewise a cuticle softener, a nail whitener and/or a nail polish.

It is one of the features of the fingernail cleaner of my invention that it is in the form of an aqueous emulsion. Preferably the emulsion contains a major proportion of water.

So far as I am aware, I have for the first time conceived of the production of a fingernail cleaner adapted to remove fingernail polish, which cleaner is in the form of an emulsion. Likewise I have for the first time found that an aqueous emulsion is effective to rapidly remove liquid polish (e. g., cellulose nitrate lacquer). My fingernail cleaner is not harsh in its effect and does not dry out or harm the fingernails or tissues surrounding the nails. My cleaner does not tend to cause removed liquid polish of high color to "run."

Other features of my fingernail cleaner which are preferably employed include its whitening and polishing effect and its tendency to soften the cuticle so that it may be readily shaped or removed. It is a further feature of my invention that the emulsion can readily be made so as to be permanent; that is, so as to stand for a long period of time without settling or "breaking."

While I prefer to make up my fingernail cleaner according to the formulae given below in order to attain certain benefits resulting from these preferred formulae, certain advantages of this invention can be obtained according to this invention by utilizing an aqueous emulsion containing a solvent for cellulose ester. Thus a solvent for cellulose ester dispersed in an aqueous emulsion by means of an emulsifying agent is effective. While a simple emulsion of this character can be used, I have found that superior results are obtained by including, in addition to the solvent, a water-insoluble substance either liquid or solid in an emulsified state. Such materials give body to the cleaner so that tendency of colors to "run" is lessened. Such insoluble materials may be oleaginous materials or solids and preferably may be present in amounts such as one per cent. to thirty per cent. In the case of oleaginous materials, a further advantage in their use lies in the fact that they act as an emollient for the fingernails and surrounding tissue and counteract the harsh effect of solvents for cellulose esters. Some oleaginous materials likewise act as a lubricant. In the case of emulsified solids, I prefer to have a substance such as a colloidal earth present in an emulsified state. Such earths are particularly effective in giving body to the cleaner. Moreover, such earths have the effect of holding other solids in suspension such as white pigments and/or polishing materials. It is very important that the nail cleaner be in the form of a stable emulsion, in order that the appearance of the product may be as desirable as possible.

The emulsifying agent that is used may be selected from a wide variety of substances. Preferably, however, those substances are selected which impart body to the mixture as well as emulsion characteristics. Thus oleaginous materials which comprise an emulsifying agent are especially desirable. A preferred oleaginous substance for use in an emulsified state (an emulsion oil) comprises a thickened (by blowing or polymerization) vegetable oil containing a small amount of free fatty acid. Such oils when used with a small amount of alkali, e. g., sodium hydroxide (or other alkalis such as other alkali metal hydroxides, soda ash, and the like) readily become emulsified to a very high degree. An example of such material is pale blown castor oil, which, when used with a small amount of alkali, yields a very permanent and desirable emulsion. Other examples of oleaginous materials are sulphonated vegetable oils (e. g., sulphonated castor oil and/or sulphonated olive oil) which, even without the presence of alkali, are adapted to produce a suitable emulsion. However, sulphonated oils may be used with alkalis to advantage. Vegetable oils which have been blown or sulphonated are on the market having a definite free fatty acid content, and are desirable from the point of view of uniformity of results when used with a predetermined desirable amount of alkali.

Other known inorganic or organic emulsifying agents, such as soaps, amines (e. g. triethanol amine), alkali metal resinates, sulphonated unsaturated fatty acids and soaps thereof, and the like, may also be used.

The vegetable oils (preferably blown or sulphonated) are preferred inasmuch as they become readily emulsified and contain ingredients which are reactive with alkalis to form an emulsifying agent, i. e., fatty acid soaps. Of course, an emulsifying agent may be introduced separately instead of being thus formed in situ. Ordinary vegetable oils such as castor oil, olive oil, linseed oil, cotton seed oil, and the like, likewise give satisfactory results. The amount of alkali that is to be used with any selected oil can be readily calculated from the higher limit of the saponification value thereof; the saponification value being defined as the number of milligrams of potassium hydroxide required to saponify one gram of the fat or oil. The saponification values ordinarily given for the oils above mentioned are olive oil 195; castor oil 185; linseed oil 195; cotton seed oil 198. If another alkali than potassium hydroxide is to be used (e. g., a 10% solution of sodium hydroxide) the required amount can be readily calculated as is well known. It is frequently desirable to employ a very slight excess of alkali for reasons given hereinbelow. Vegetable oils are particularly effective as an emollient for the fingernails and tissues surrounding the nails. Thus the vegetable oils have distinct utility in contrast with mineral oils which act primarily as a lubricant. In the fingernail cleaners of this invention, it is preferable to use about one per cent. to twenty per cent. of emulsified vegetable oil.

It has been pointed out above that a vegetable oil adapted to react with alkali to produce an emulsifying agent suitable for maintaining a stable emulsion of oleaginous material may be used. The alkali in such case has the effect of aiding in the formation of a stable emulsion. In addition to this function of the alkali, I have been able to utilize the softening effect of alkali on the cuticle by incorporating a slight excess of alkali, and have thus produced a cleaner which both removes liquid nail polish and at the same time softens the cuticle. Thus when an emulsion oil such as pale blown castor oil is used, an amount of alkali can be used which gives a pH value of about 7.5 to about 10.5 to the mixture. The alkali (e. g., NaOH) thus forms a certain amount of soap as an emulsifying agent and in addition a certain amount of it occurs as free alkali—namely, alkali which is uncombined and is effective to give definite alkalinity to the mixture as a whole. The advantage of the free alkali as a cuticle softener may, of course, be utilized regardless of whether or not a vegetable oil is present which reacts to form soap with part of the alkali. Other alkalis than sodium hydroxide may be used, such as other alkali metal hydroxides, soda ash and similar substances. Ordinarily, sodium hydroxide is preferred.

In addition to or instead of oleaginous materials colloidal clays may be suspended in an emulsified state in water. Thus bentonite clay, kaolin, infusorial earth, kieselguhr, etc., may be used. Of these substances, bentonite clay has distinct advantages. In the first place, as readily obtainable on the market, it does not tend to discolor the emulsion and is adapted to yield an emulsion of highly white and attractive character when used with relatively small amounts of white pigment. In the second place, it is highly absorptive of water and results in a more highly hydrated, stable and bulky emulsion. Bentonite clay can be used alone and is so colloidal in character that it will remain emulsified without any other emulsifying agent being present. Thus a mixture of bentonite clay (about 3.5%), water, and butyl acetate (about 25%) resulted in a stable emulsion and was effective to remove nail polish. Such emulsion may also contain a white pigment and/or polishing material such as tin oxide. When the colloidal earth itself is adapted to become dispersed in water as a stable emulsion, the colloidal earth is to be regarded herein as an emulsifying agent. However, other emulsifying agents may be and preferably should be used together with the colloidal earth. Preferably also, an oleaginous material in the nature of a vegetable oil is used in conjunction with the colloidal earth. When a colloidal earth is used, it is usually preferable to use this material in amounts such as about .5% to about 5%.

The presence of colloidal earth is helpful in permitting the use of an amount of alkali which results in a substantial amount of free alkali. Thus free alkali tends to break an emulsion when it occurs in substantial amounts, and I have found that this tendency is greatly counteracted by the presence of a colloidal earth such as bentonite clay.

In view of the foregoing, the term "emulsion" is used herein to refer to either a liquid or a solid dispersed in an emulsified state in water.

With such emulsifying agents and/or emulsified materials, I have found that solvents for cellulose ester can be successfully incorporated in a dispersed condition. Moreover, such materials are in a surprisingly effective condition to remove liquid nail polish. As examples of solvents which may be used, acetone and butyl acetate may be referred to. Butyl acetate is insoluble in water but in the presence of the emulsifying agents (either liquid or solid) becomes distributed in the mixture and in such small amounts as 15% removes the ordinary cellulose nitrate liquid nail polish very rapidly. Acetone, on the other hand, is soluble in water and becomes distributed in the mixture for this reason. In the case of acetone about 25%, by itself dissolves nitrocellulose nail polish rather slowly but about 30% gives a considerably more rapid action. For this reason, the water-insoluble solvents for cellulose esters (e. g., for cellulose nitrate) are ordinarily preferable.

While butyl acetate and acetone may be used separately, I have found that special advantages are afforded by using a mixture of these substances in an aqueous emulsion. Thus if butyl acetate is added to acetone, the effectiveness of the acetone for removing liquid nail polish is greatly increased. For example, I have found it very advantageous to use about 15% of acetone and 15% of butyl acetate as the solvent component for my liquid nail cleaner. In general the effectiveness of a water soluble solvent for cellulose ester such as acetone can be enhanced by the presence of a liquid substance which in the amount used occurs as a separate undissolved liquid phase in the water that is present and which dissolves a substantial amount of said solvent. Butyl acetate is an example of such a substance which in the amount used is insoluble in water and which is capable of dissolving a certain amount of acetone, for example. A substance such as butyl acetate is particularly desirable for the reason that this substance is not only a solvent for acetone but also is a solvent for cellulose ester. It is not essential, however, that the substance be in itself a solvent for the cellulose ester.

Thus benzene and its homologues are not regarded as solvents for cellulose esters but are adapted to increase the effectiveness of water soluble solvents for cellulose esters (e. g. cellulose nitrate) that are soluble therein. For example, benzene is a solvent for acetone and is insoluble in water and when acetone is included in an aqueous emulsion containing benzene, for example, the acetone is rendered much more effective as a solvent for cellulose ester due to the presence of the benzene. Benzene and its homologues are non-ionizing in character and non-ionizing liquids are especially useful in increasing the effectiveness of water soluble solvents for cellulose ester which are soluble therein. It is one of the features of this invention that when a water soluble solvent for cellulose ester (e. g. cellulose nitrate) is used I prefer to include in an emulsified condition a liquid substance which dissolves the solvent for the cellulose ester and which occurs undissolved in the water. Moreover, of such liquid water-insoluble substances, I prefer to employ a substance which is itself a solvent for cellulose ester.

In addition to acetone and butyl acetate, other solvents for cellulose ester may be used and such solvents are well known in the art. Thus other examples are ethyl acetate, methyl acetate, butyl formate, methyl ethyl ketone, propyl alcohol, isopropyl alcohol, butyl alcohol, diacetone alcohol, amyl alcohol, amyl acetate, amyl propionate, ethyl propionate, ethyl lactate, and butyl lactate. When a water soluble solvent for cellulose ester such as butyl alcohol, propyl alcohol or ethyl lactate is employed, it is desirable to have present in addition a substance such as amyl acetate, butyl formate or amyl propionate which in the amount used occurs undissolved in water and which dissolves the water soluble solvent for cellulose ester. The water insoluble substances last-mentioned are useful for the additional reason that they have a solvent action for cellulose ester. In the usual liquid nail polish which is on the market, the lacquer ingredient is cellulose nitrate. In such case, the solvent used in the nail cleaner should be especially strong in its solvent action for cellulose nitrate. If, however, another cellulose ester nail polish were used, e. g., cellulose acetate, it is apparent that the solvent used should be especially selected for its solvent action for cellulose acetate. The solvent is normally used in amounts ranging from about 15% to about 40%.

In addition to the foregoing, I have afforded a nail polish remover which has still further attributes. Thus, according to one method of practicing this invention, I have incorporated with the nail polish remover a certain amount of a white pigment such as titanium oxide, zinc oxide, barium sulphate, calcium sulphate and the like. Of these pigments, I prefer to use titanium oxide. Such pigments are preferably used in amounts such as about .2% to about 3%.

In addition, I have incorporated in my nail polish a material having a polishing effect on fingernails such as tin oxide. Such material is preferably used in amounts ranging from about .3% to about 3%.

The pigment and/or the tin oxide tend to settle out somewhat when the colloidal earth is not present. However, when the colloidal earth is present in an emulsified state, the colloidal earth appears to have the effect of carrying the white pigment and/or tin oxide, at least the resulting emulsion is capable of standing for long periods of time without settling. Thus, when a white pigment and/or tin oxide is to be used, it is preferable to include a colloidal earth in my fingernail cleaner.

In addition to the foregoing ingredients, certain additional materials may be incorporated. Thus a lubricant oil such as a mineral oil, e. g., liquid petrolatum, may be used. The use of a mineral oil is not essential to the practice of this invention, however. When a mineral oil is used, it is preferable to employ only about .3% to about 5%.

Nail cleaners embodying this invention may take several different forms within the scope of this invention. Several examples are given below.

*Example I*

|  | Per cent |
|---|---|
| Emulsified oil | 1 to 20 |
| Solvent for cellulose ester | 15 to 40 |
| Water | Balance |

*Example II*

|  | Per cent |
|---|---|
| Emulsified colloidal earth | .5 to 5 |
| Solvent for cellulose ester | 15 to 40 |
| Water | Balance |

*Example III*

|  | Per cent |
|---|---|
| Emulsified vegetable oil | 1 to 20 |
| Emulsified colloidal earth | .5 to 5 |
| Solvent for cellulose ester | 15 to 40 |
| Water | Balance |

In Examples I, II and III, an added emulsifying agent may or may not be used. Thus with sulphonated oil and/or bentonite clay, no added emulsifying agent other than these substances themselves is necessarily essential. However, when a vegetable oil is used, it is usually desirable to have soap present either by direct addition or by formation in situ as a result of reaction of free fatty acids in the oil with added alkali.

*Example IV*

|  | Per cent |
|---|---|
| Emulsified vegetable oil | 1 to 10 |
| Emulsified colloidal earth | .5 to 5 |
| Solvent for cellulose ester | 15 to 40 |
| Water | Balance |
| Free alkali (NaOH) | Sufficient to give the mixture a a pH of 7.5 to 10.5 |

*Example V*

|  | Per cent |
|---|---|
| Emulsified vegetable oil | 1 to 10 |
| Emulsified colloidal earth | .5 to 5 |
| Solvent for cellulose nitrate | 15 to 40 |
| Titanium oxide | .2 to 3 |
| Tin oxide | .3 to 3 |
| Water | Balance |
| Free alkali (NaOH) | Sufficient to give the mixture a a pH of 7.5 to 10.5 |

Aditional specific examples follow:

*Example VI*

|  | Per cent |
|---|---|
| Sulphonated oil (sulphonated olive oil) | 10 |
| NaOH (10% solution) | 1 |
| Butyl acetate | 15 |
| Acetone | 15 |
| Totanium oxide | .5 |
| Bentonite clay | 2 |
| Water | Balance |

Example VII

| | Per cent |
|---|---|
| Pale blower castor oil | 1 |
| NaOH (10% solution) | .5 |
| Butyl acetate | 15 |
| Acetone | 15 |
| Titanium oxide | 1 |
| Tin oxide | 1 |
| Bentonite clay | 2.25 |
| Water | Balance |

Example VIII

| | Per cent |
|---|---|
| Pale blown castor oil | 4 |
| Sulphonated castor oil | 5 |
| NaOH (10% solution) | 1.25 |
| Butyl acetate | 25 |
| Titanium oxide | .5 |
| Tin oxide | .5 |
| Bentonite clay | 1.5 |
| Water | Balance |

Example IX

| | Per cent |
|---|---|
| Pale blown castor oil | 7.25 |
| NaOH (10% solution) | .75 |
| Liquid petrolatum | .5 |
| Acetone | 35 |
| Lemonene | 1 |
| Water | Balance |

Example X

| | Per cent |
|---|---|
| Pale blown castor oil | 15 |
| NaOH (10% solution) | 2 |
| Butyl acetate | 15 |
| Acetone | 15 |
| Bentonite clay | 2 |
| Titanium oxide | 1 |
| Tin oxide | 1 |
| Liquid petrolatum | 5 |
| Water | Balance |

Example XI

| | Per cent |
|---|---|
| Olive oil | 5 |
| NaOH (10% solution) | 8 |
| Acetone | 15 |
| Butyl acetate | 15 |
| Titanium oxide | 1 |
| Tin oxide | 1 |
| Bentonite | 2 |
| Water | Balance |

Example XII

| | Per cent |
|---|---|
| Linseed oil | 5 |
| NaOH (10% solution) | 8 |
| Acetone | 15 |
| Butyl acetate | 15 |
| Titanium oxide | 1 |
| Tin oxide | 1 |
| Bentonite | 2 |
| Water | Balance |

Example XIII

| | Per cent |
|---|---|
| Cottonseed oil | 5 |
| NaOH (10% solution) | 8 |
| Acetone | 15 |
| Butyl acetate | 15 |
| Titanium oxide | 1 |
| Tin oxide | 1 |
| Bentonite | 2 |
| Water | Balance |

Example XIV

| | Per cent |
|---|---|
| Castor oil (not blown) | 5 |
| NaOH (10% solution) | 7.5 |
| Acetone | 20 |
| Benzene | 15 |
| Titanium oxide | 1 |
| Tin oxide | 1 |
| Bentonite | 2 |
| Water | Balance |

The nail cleaner can be manufactured in any suitable way by mixing the ingredients and causing them to be dispersed in an emulsified state. When, however, bentonite clay is included in the mixture, it is highly desirable to permit the bentonite clay to stand in the presence of a substantial part of the water of the mixture, e. g., about 20% of the water, until the bentonite clay has become hydrated. This usually takes place in about twelve hours. After the bentonite clay (or other colloidal earth) has absorbed water, it is then desirable to add any pigment and/or polishing materials that are used. The rest of the ingredients desired in the finished cleaner are then added, e. g., the emulsion oil, the lubricant, the solvent, the alkali, and the balance of the water. If an oil is to be used in a saponified condition it is usually desirable to saponify the oil separately with the alkali before it is added to the other ingredients. Merely by agitation, the materials can be dispersed in an emulsified state in the water. The resulting emulsion can then be placed in suitable containers for shipment and sale.

According to my invention, I have afforded a fingernail cleaner which is unlike any fingernail cleaner heretofore known. My fingernail cleaner when applied to the nails immediately removes any liquid nail polish on the fingernails. This removal is not attended with any harsh or drying effects. On the contrary, the cleaner acts as an emollient. Likewise the colored liquid nail polish that is removed does not run under the nails or onto the cuticle where it is difficult to remove, but is taken up in the emulsion and is removed upon removing the emulsion. When the emulsion is removed, this can be accomplished with a buffing action and the nail cleaner is such that a polish may be imparted to the fingernail. Moreover, the nail polish is such as to have a whitening effect on the under side of the nails and on any crevices about the nails. In addition, in the cleaning operation, the cuticle will have been softened and placed in condition for shaping and trimming. From the foregoing, it is apparent that my fingernail cleaner has a large number of advantageous properties and represents a great improvement on any fingernail cleaner heretofore proposed. Moreover, my fingernail cleaner is made of inexpensive materials and my cleaner can be placed on the market at an attractive price.

Fingernail cleaner, embodying my invention, has excellent non-settling properties. Moreover, there is no tendency of the emulsion to break. This is quite unexpected when it is considered that there is a relatively large amount of solvent for cellulose ester present with the water. Moreover, when it is considered that pigments and the like tend to settle in paints and the like, it is notable that the pigments (e. g., titanium oxide) and/or tin oxide do not tend to settle out. It is also surprising that notwithstanding the large amount of water present (water normally tending to precipitate cellulose esters), the cleaner rapidly removes liquid nail polish. This feature of applicant's invention has been subjected to many tests indicating the marked efficacy of the cleaner in removing liquid nail polish.

While this invention has been described in connection with certain specific embodiments thereof, it is to be understood that this has been done merely for the purpose of illustration and that the scope of this invention is to be determined according to the language of the following claims.

I claim:

1. A fingernail cleaner which comprises water, about one per cent. to about ten per cent. of an oil selected from the group consisting of pale blown castor oil and sulphonated oils in an emulsified state in said water, about .5% to about 5% of bentonite clay in an emulsified state in said water, about fifteen per cent. to about forty per cent. of solvent for cellulose nitrate which has effective solvent properties of cellulose nitrate in to give the emulsion a pH value of about 7.5 to the presence of said water, and sufficient NaOH about 10.5.

2. A fingernail cleaner which comprises water, about one per cent. to about ten per cent. of an oil selected from the group consisting of pale blown castor oil and sulphonated oils in an emulsified state in said water, about .5% to about 5% of bentonite clay in an emulsified state in said water, about fifteen per cent. to about forty per cent. of solvent for cellulose nitrate which has effective solvent properties of cellulose nitrate in the presence of said water, sufficient NaOH to give the emulsion a pH value of about 7.5 to about 10.5, and about .5% to 1.5% of liquid petrolatum.

3. A fingernail cleaner which comprises water, about one per cent. to about ten per cent. of pale blown castor oil in an emulsified state in said water, about .5% to about 5% of bentonite clay in an emulsified state in said water, about fifteen per cent. to about forty per cent. of a mixture of acetone and butyl acetate, and sufficient NaOH to give the emulsion a pH value of about 7.5 to about 10.5.

HORACE M. CARTER.

CERTIFICATE OF CORRECTION.

Patent No. 2,197,630.                                            April 16, 1940.

HORACE M. CARTER.

It is hereby certified that error appears in the printed specification of the above numbered patent requiring correction as follows: Page 1, second column, line 52, for the word "desirable" read --desired--; page 2, first column, line 73, for "plate" read --place--; and second column, line 34, for "condition" read --conditions--; page 3, second column, line 73, in the table, Example VI, for "Totanium" read --Titanium--; page 4, first column, line 1, in the table, Example VII, for "blower" read --blown--; page 5, first column, line 24, claim 1, strike out the words "to give the emulsion a pH value of about 7.5 to" and insert the same before "about", second column, line 2, same claim; and that the said Letters Patent should be read with this correction therein that the same may conform to the record of the case in the Patent Office.

Signed and sealed this 25th day of June, A. D. 1940.

(Seal)
Henry Van Arsdale,
Acting Commissioner of Patents.